United States Patent Office 3,258,353
Patented June 28, 1966

3,258,353
MAGNESIA REFRACTORY PRODUCT AND PROCESS
Russell Pearce Heuer, Villanova, Pa., assignor to General Refractories Company, a corporation of Pennsylvania
No Drawing. Filed Jan. 25, 1963, Ser. No. 253,986
14 Claims. (Cl. 106—59)

The present invention relates to basic refractory products whose primary constituent is calcined magnesia, and to processes for producing the same.

A purpose of the invention is to produce a magnesia or chrome magnesia refractory product which will have improved high temperature properties and can be produced at lower cost.

A further purpose is to employ calcined magnesia which has a very low content of silica, between 0.08 and 2%, and preferably not in excess of 1%, and which also has a content of dicalcium ferrite of between 1.5 and 7.0 percent, and overcome the previously encountered poor refractory properties by permitting the dicalcium ferrite to react with previously unreacted chromic oxide present to the extent of 1 to 10 percent at a temperature in excess of 1000° C. Thus the dicalcium ferrite, instead of producing a low melting ingredient which impairs the refractoriness of the brick or other refractory product, forms a refractory spinel which imparts a high temperature bond.

Further purposes appear in the specification and in the claims.

There have been several different procedures followed in the prior art in dealing with the problem of creating a high temperature refractory from available sources of calcined magnesia.

It has been previously recognized that refractory products containing calcined magnesia give better service at elevated temperatures such as operating conditions in a metallurgical furnace roof, wall or lining if the bulk specific gravity of the calcined magnesia is high, for example at least 3.10 and preferably in excess of 3.25. One of the problems, therefore is how to produce a calcined magnesia of such bulk specific gravity.

High specific gravity calcined magnesia also gives better service in many cases if its silica content is kept low, in the range between 0.05 and 2% and preferably not in excess of 1%.

There are several different procedures which have been followed in the prior art in obtaining a calcined magnesia of high bulk specific gravity and low silica content:

(1) There are elaborate and expensive techniques, for example as outlined in U.S. Patent No. 3,060,000, by which a magnesia of high bulk specific gravity can be obtained with a low silica content. For many purposes, however, such expensive products cannot be used because of the cost.

(2) It is common practice to promote the production of a high bulk specific gravity calcined magnesia by adding silica prior to calcining. In this case a suitable starting material such as magnesium hydrate, magnesium carbonate or any other suitable magnesium compound is mixed with silica to produce a calcined magnesia having a silica content of 2 to 6%. The bulk specific gravity can readily be made high (3.20 or more), but the presence of the silica is objectionable.

(3) Another prior art technique which permits obtaining a calcined magnesia of low silica content and high bulk specific gravity is to add iron oxide prior to calcining. The presence of dicalcium ferrite during calcining facilitates the calcining operation and increases the bulk specific gravity. It is, however, difficult to bond such magnesia for such high temperature use since there are no silicates present which can act as a bond and as well known, the dicalcium ferrite develops a liquid phase at about 1200° C. Such refractories fail under a static load of 25 p.s.i. in a laboratory test at temperatures below 1600° C.

In my copending U.S. application Serial No. 66,903, now Patent No. 3,108,007, I have described a method of destroying the dicalcium ferrite and thus preventing the formation of a low temperature liquid phase by mixing together two different magnesias, as follows:

(1) A calcined magnesia containing dicalcium ferrite.
(2) A calcined magnesia containing silica in the form of forsterite or monticellite.

This mixture under high temperature treatment causes the silica to react with the fusible dicalcium ferrite to form dicalcium silicate and magnesium ferrite, both of which components are more refractory. This refractory is higher in silica than the initial calcined magnesia, and to this extent less desirable.

I have discovered that the advantages of higher chemical resistance can be obtained in a magnesia of high bulk specific gravity which nevertheless contains between 1½ and 7 percent of dicalcium ferrite by adding to the refractory between 1 and 10 percent and preferably between 3 and 5 percent, of chromic oxide which will react with the dicalcium ferrite to destroy it upon heating and thus to overcome the difficulty due to its low fusion temperature. It should be emphasized that the chromic oxide referred to is unreacted chromic oxide and not chromic oxide which already forms part of a compound such as a spinel, for example as present in refractory chrome ore or chromite. Such chromic oxide already reacted is not capable of functioning to destroy the dicalcium ferrite as required in the present invention.

Thus, for the purpose of the present invention, a calcined magnesia of high bulk specific gravity and low silica is needed which contains dicalcium ferrite, and this calcined magnesia is mixed with from 1 to 10 percent of chromic oxide on the weight of the mix. When such a mixture is heated, the unreacted chromic oxide reacts with the readily fusible dicalcium ferrite to form a very refractory spinel of the type $RO \cdot R_2O_3$ which contains $Cr_2O_3$. This reaction begins at relatively low temperatures, such as 1000° C. The calcined magnesia refractory produced is relatively free from fusible substances and will withstand a static load of 25 p.s.i. under laboratory test up to a temperature above 1700° C.

Chromic oxide can be obtained from commercial sources if desired. One way of making the chromic oxide is to calcine chromite with lime and soda to form sodium chromate. The sodium chromate thus produced is extracted by water and thus the other oxides originally present in the chromite are removed. The sodium chromate is then reduced by suitable reducing agent, for example, by boiling with sulphur, to form hydrous chromic oxide which is insoluble in water and can be removed by filtration, the sodium salt being soluble in water. The chromic oxide is then dried and calcined at moderate or high temperature if desired.

I employ the chromic oxide in granular or powder form. One procedure is to use chromic oxide in the form of a fine powder which has passed through a screen of 100 mesh per linear inch or 250 mesh per linear inch, or finer as desired. For some purposes, however, chromic oxide in granular form may be used, for example that which has passed through a screen of 4 mesh per linear inch or 8 mesh per linear inch, and rested on a screen of say 20 mesh per linear inch or 28 mesh per linear inch. For other purposes, the chromic oxide may be of intermediate size, for example between 20 mesh and 28 mesh per linear inch.

The calcined magnesia may be obtained as a mineral deposit or from sea water or brine, as desired.

The magnesia from Austria is desirable. The natural magnesium carbonate can be beneficiated to remove objectionable impurities. The magnesium carbonate, purified if desired, is calcined, in briquette form if necessary, in a kiln at a temperature preferably in excess of 1500° C. to obtain the desired physical form and the high bulk specific gravity.

In dealing with magnesium hydrate prepared from sea water or brine, the material may first be lightly calcined, if desired, before the final calcining.

In order that the advantages of high bulk specific gravity can be obtained economically without additions of silica, iron oxide if not already present will be added, and lime if not already present will be added, so as to produce a content of dicalcium ferrite in a range between 1.5 and 7 percent on the weight of the calcined magnesia. It is not necessary to have a preliminary calcine, but the iron oxide if required, and the lime if required can be added before the initial calcine and the required content of dicalcium ferrite obtained. For the purposes of the present invention, the silica content should be less than 2 percent and preferably less than 1 percent, so that the chemical properties of refractory products produced will be exceptionally good.

In the following table, No. 1 and No. 2 represent calcines obtained from natural Austrian magnesite which are low in lime; No. 3 shows a calcine obtained from a natural magnesite which has intermediate lime of about 7%; No. 4 shows an analysis of a calcine obtained from a natural magnesite which is high in lime (up to 15 percent) and No. 5 shows a calcine from a magnesite which is obtained from sea water or brine.

TABLE I

|  | No. 1 | No. 2 | No. 3 | No. 4 | No. 5 |
| --- | --- | --- | --- | --- | --- |
| L.O.I. | 0.46 | 0.23 | 0.40 | 0.60 | 0.20 |
| $SiO_2$ | 0.53 | 0.86 | 0.75 | 1.35 | 1.01 |
| $Fe_2O_3$ | 6.47 | 6.21 | 5.75 | 5.45 | 4.90 |
| $Al_2O_3$ | 0.34 | 0.76 | 0.59 | 0.55 | 0.21 |
| CaO | 1.81 | 2.52 | 6.07 | 14.10 | 3.18 |
| MgO (diff.) | 90.39 | 89.42 | 86.48 | 77.95 | 90.50 |
| Bulk Sp. Gr. | 3.31 | 3.26 | 3.20 | 3.09 | 3.30 |

The calcined magnesia may be formed into bricks in the conventional manner. The calcine is crushed, ground and screened to form coarse particles A which pass through a four or five mesh per linear inch screen and rest on an eight or ten mesh per linear inch screen; coarse particles B which pass through an eight or ten mesh per linear inch screen and rest on a twenty or twenty-eight mesh per linear inch screen; and fine particles C which pass through a forty-eight mesh or one hundred mesh per linear inch screen or finer if desired.

These screened particles may be mixed in the following manner provided that the total amount of coarse particles A and B together is in excess of sixty parts by weight.

TABLE II

Parts by weight
Coarse particles A _____ 0–60
Coarse particles B _____ 0–60
Fine particles C _____ 15–40

The magnesia particles will contain between zero or say 0.05 and 2 percent and preferably not in excess of 1 percent of silica, between 1.5 and 7 percent of dicalcium ferrite, and between 0.6 and 15 percent of lime (the lime for many purposes being limited to 5 percent or in some cases 7 percent), it being understood that the lime included in the dicalcium ferrite is included in this quantity, the balance except for minor impurities such as alumina usually less than 1 percent being magnesia. In the preferred embodiment, the content of MgO of the calcined magnesia will be in excess of 90 percent. To the magnesia particles is added 1 to 10 percent of their weight of $Cr_2O_3$.

The refractory is then mixed with water and if it is to be used as an unburned refractory without kiln firing, a bonding substance of one of the well known types for unfired magnesia refractories will be used, such as sulphuric acid, magnesium sulphate, magnesium chloride or other suitable well known inorganic bonding agents, or an organic bond may be used such as sulfite waste liquor, starch or dextrine. The quantity of such bond will be from 0.5 to 1.1 percent of sulphuric acid on the dry weight of the brick, and in general the content of such bonding agent will be between 0.5 and 5.0 percent on the dry weight of the brick. It will be understood that this is not included in the 100 percent composition of the refractory ingredients such as the magnesia, the chromite if any, and the chromic oxide.

The refractory in the ordinary case is then pressed into brick or other desired refractory product under a pressure exceeding 5000 p.s.i. and preferably exceeding 15,000 p.s.i.

The pressed brick are then dried and if they are to be used without kiln firing they are preferably treated with gaseous carbon dioxide after drying to improve the low temperature bond.

Such unfired brick may become molded with internal steel sheets or other steel elements and may have external steel sheets or other steel elements applied by comolding. In the case of fired brick as well as unfired brick external steel sheets or other steel elements can be applied after molding or during assembly into the metallurgical furnace.

In some cases it will be desired to fire the brick in a kiln but such kiln firing may be somewhat lower in temperature than would otherwise be necessary due to the reaction of the chromic oxide and the dicalcium ferrite which begins to form a bond at temperatures of 1000° C. The firing temperature should be 1400° C. or above.

The brick of the invention give improved results in the walls, linings and roofs of metallurgical furnaces, such as steel making furnaces such as the open hearth, electric furnaces and oxygen blown vessels, and are also useful in other metallurgical furnaces.

For most purposes, the calcined magnesia employed in the process of the present invention will contain more than 90 percent by weight of MgO. For many purposes the lime content of the magnesia should be limited to 5 percent. For some purposes, however, such as the L–D oxygen converter, the content of lime may be as high as 7 percent or even 15 percent or more, counting the lime which is present in the dicalcium ferrite. In making such brick having high lime, water admixtures and bonds as above referred to may be used where the lime is 7 percent by weight or less, so that no uncombined lime is present. If the lime is substantially higher than 7 percent, and particularly if the lime is as high as 15 percent, water should be avoided and a tar bond should be used in making the refractory brick.

In some cases refractory chrome ore or chromite will be incorporated in the magnesia brick to an extent of about 40 percent by weight of the dry brick. It should be noted that in this case the chromic oxide is already reacted in the chromite to form a spinel and this is wholly different from the addition of free chromic oxide added to magnesia containing dicalcium ferrite because the free chromic oxide reacts to produce a new spinel whereas the combined chromic oxide in chrome ore is already in the form of a spinel and does not form a new spinel. The refractory chrome ore or chromite is added not to influence the composition of the magnesia, but to impart its own properties to the refractory.

In my copending application Serial No. 66,903, chrome ore is added to a magnesia which contains a substantial amount of silica as an impurity. The silica improves the refractory by combining with the lime present in the dicalcium ferrite and thus to an extent destroys the dicalcium ferrite.

In the present invention, however, silica is very low, and dicalcium ferrite is destroyed by the chromic oxide.

I prefer to use a refractory chrome ore low in silica, that is having a silica content less than 6 percent, and the amount of refractory chrome ore should be between 5 and 40 percent of the weight of the dry refractory and preferably between 10 and 20 percent of the weight of the dry refractory.

Although the invention is primarily concerned with making molded refractory brick, the mixture of the present invention can be used in dry granular form to ram or gun into place so that it will sinter to make or repair the hearth of a metallurgical melting furnace. For this purpose it will be tempered with water (5 percent) or (7 percent) and rammed or otherwise placed in position to form a monolithic part of a metallurgical furnace. It may be made up in a water dispersion or a suspension which uses about 25 to 30 lbs. of water for each 100 lbs. of refractory to be sprayed upon the roof or walls of a metallurgical furnace in actual service.

It is important to keep in mind the way in which the amount of dicalcium ferrite is determined. I first calculate the amount of lime required to unite with the silica present to form dicalcium silicate, $C_2S$, and I subtract this from the total lime present to find the amount of lime in excess. This excess of lime to the extent needed is then assumed to combine with iron oxide to form dicalcium ferrite, $C_2F$. Any small amount of alumina presen, which normally does not exceed 1 percent, will form tetracalcium aluminum ferrite, $C_4AF$, but I consider this as included in the calculated amount of dicalcium ferrite since the quantity of tetracalcium aluminum ferrite is small and it behaves similarly to the dicalcium ferrite.

It will be evident that where the content of lime of a magnesia is mentioned, it is intended to indicate the total content of lime whether it is present as calcium silicate, dicalcium ferrite or free lime, or any combination of these.

Example 1

A calcined magnesia made from natural magnesium carbonate containing 90 percent magnesia, 0.5 percent silica and 1.7 percent dicalcium ferrite is mixed with chromic oxide. The bulk specific gravity of the magnesia is greater than 3.2. The size of the magnesia particles and chromic oxide particles and their proportions in parts by weight are shown in the following table:

| | Parts by weight |
|---|---|
| MgO, 4 x 8 mesh | 25 |
| MgO, 8 x 28 mesh | 47.5 |
| MgO, thru 48 mesh | 27.5 |
| $Cr_2O_3$, thru 100 mesh | 5 |

The mixture is moistened with 2 percent of water and 1 percent of sulfuric acid is added with the water, both on the weight of the dry mix.

The mix is molded into brick under a pressure exceeding 15,000 p.s.i.

The bricks are dried and treated with gaseous carbon dioxide to improve the bond.

The properties of the brick are as follows:

| | |
|---|---|
| Bulk specific gravity | 3.00 |
| Cold modulus of rupture | 2712 p.s.i. |
| Hot modulus of rupture at 1260° C. | 585 p.s.i. |
| Temperature of failure under 25 p.s.i. static load | Above 1770° C. |
| Shrinkage after heating to 1650° C. | 0.60% (linear). |

Example 2

In this case the brick mix as in Example 1 employs 10 percent of chromic oxide. A satisfactory magnesia brick is made by this procedure.

Example 3

The procedure of Example 1 is carried out except that the brick is fired above 1500° C. The properties are similar to those of Example 1.

Example 4

A brick composition is made according to the following formula, in which the magnesia is magnesia No. 2 as above referred to, and the refractory chromite or chrome ore preferably from the Transvaal whose composition is described in detail in my U.S. Patent No. 2,656,280:

| | Parts |
|---|---|
| Magnesia: | |
|   4 x 8 mesh | 57.5 |
|   Thru 100 mesh | 30.0 |
| Chrome particles: 4 x 8 mesh | 12.5 |
| $Cr_2O_3$ | 5.0 |

It will be evident that the refractory chromite contains silica as an impurity and silica combines with some of the lime present in the dicalcium ferrite to partially destroy the same. The chromic oxide completes the destruction of the dicalcium ferrite.

The properties of the magnesia-chrome refractory brick produced in this example are as follows:

| | |
|---|---|
| Bulk density | 3.05. |
| Cold modulus of rupture | 2560 p.s.i. |
| Hot modulus at 1260° C. | 677 p.s.i. |
| Temp. of failure under 25 p.s.i. static load | Above 1770° C. |
| Shrinkage after heating to 1650° C. | 0.1% linear. |

These bricks are capable of giving excellent service in a steel making furnace.

Thus it will be understood that in making a magnesia-chrome brick according to the present invention I will employ from 59 to 94 percent of particles of calcined magnesia as described herein with between 5 and 40 percent of particles of refractory chrome ore and between 1 and 10 percent of particles of unreacted chromic oxide. I will also usually employ a bonding substance, but the percentage of bonding substance will not be included in 100 percent of the dry refractory but will be calculated over and above that.

All percentages given herein are percentages by weight, except where it is clear from context that something else is intended, as in the case of percentage linear shrinkage.

All mesh sizes given herein are Tyler Standard Mesh per Linear Inch.

In view of my invention and disclosure, variations and modifications to meet individual whim or particular need will doubtless become evident to others skilled in the art to obtain all or part of the benefits of my invention without copying the process and composition shown, and I therefore claim all such insofar as they fall within the reasonable spirit and scope of my claims.

In view of my invention and disclosure, what I claim as new and desire to secure by Letters Patent is:

1. A process of producing a magnesia refractory product of improved high temperature properties, which comprises
   (a) mixing together particles of calcined magnesia, said calcined magnesia having the following properties and composition:

| | |
   |---|---|
   | Bulk specific gravity | At least 3.10 |
   | Silica | Between 0.05 and 2% |
   | Dicalcium ferrite | Between 1.5 and 7% |
   | Total lime | Between 0.6 and 15% |
   | MgO | Balance, except for minor impurities |

(b) with between 1 and 10% on the weight of the mix of particles of unreacted chromic oxide,
   (c) forming said mix into a refractory brick, (d) and subjecting the refractory brick to a temperature in excess of 1000° C. to permit the chromic oxide to react with the dicalcium ferrite to produce a bond which is effective at elevated temperatures.

2. A process of claim 1, in which the calcined magnesia has a silica content not in excess of 1%.

3. A process of claim 1, in which the calcined magnesia has a magnesia content in excess of 90%.

4. A process of claim 1, in which the content of unreacted chromic oxide is between 3 and 5%.

5. A process of claim 1, in which the calcined magnesia has the following composition:

| | |
|---|---|
| Silica | Not in excess of 1% |
| Lime | Not in excess of 7% |
| MgO | In excess of 90% | and in which the quantity of unreacted chromic oxide is between 3 and 5%.

6. A process of producing a magnesia-chrome brick of improved high temperature properties, which comprises
(a) mixing together from 59 to 94% of particles of calcined magnesia having the following properties and composition:

| | |
|---|---|
| Bulk specific gravity | At least 3.10 |
| Silica | Between 0.05 and 2% |
| Dicalcium ferrite | Between 1.5 and 7% |
| Total lime | Between 0.6 and 5% |
| MgO | Balance, except for minor impurities |

(b) with between 5 and 40% by weight of particles of refractory chrome ore,
(c) and with between 1 and 10% of particles of unreacted chromic oxide,
(d) forming the mix into a refractory brick,
(e) and subjecting the refractory brick to a temperature in excess of 1000° C. to permit the chromic oxide to react with the dicalcium ferrite to produce a bond effective at elevated temperatures.

7. A process of claim 6, in which the calcined magnesia has the following composition:

| | |
|---|---|
| Silica | Not in excess of 1% |
| Lime | Not in excess of 7% |
| MgO | In excess of 90% | in which the content of refractory chrome-ore is between 10 and 20% and the content of chromic oxide is between 3 and 5%.

8. A basic refractory brick which essentially consists of
(a) particles of calcined magnesia, having the following properties and composition:

| | |
|---|---|
| Bulk specific gravity | At least 3.10 |
| Silica | Between 0.5 and 2% |
| Dicalcium ferrite | Between 1.5 and 7% |
| Total lime | Between 0.6 and 5% |
| MgO | Balance, except for minor impurities |

(b) between 1 and 10% of chromic oxide, said chromic oxide being adapted to react at a temperature in excess of 1000° C. with the dicalcium ferrite to produce a bond effective at elevated temperatures.

9. A refractory brick of claim 8, in which the silica is not in excess of 1%.

10. A refractory brick of claim 8, in which the lime is not in excess of 7%.

11. A refractory brick of claim 8, in which the MgO is in excess of 90%.

12. A refractory brick of claim 8, in which the chromic oxide is between 3 and 5%.

13. A magnesia-chrome basic refractory brick essentially consisting of
(a) particles of calcined magnesia having the following properties and composition:

| | |
|---|---|
| Bulk specific gravity | At least 3.10 |
| Silica | Between 0.05 and 2% |
| Dicalcium ferrite | Between 1.5 and 7% |
| Total lime | Between 0.6 and 5% |
| MgO | Balance, except for minor impurities |

(b) between 5 and 40% of refractory chrome-ore,
(c) and between 1 and 10% of chromic oxide, the chromic oxide being adapted to react at a temperature in excess of 1000° C. with dicalcium ferrite to produce a bond effective at elevated temperatures.

14. A refractory brick of claim 13, in which the calcined magnesia has the following composition:

| | |
|---|---|
| Silica | Not in excess of 1% |
| Lime | Not in excess of 7% |
| MgO | In excess of 90% | the refractory chrome-ore is between 10 and 20%, and the chromic oxide is between 3 and 5%.

References Cited by the Examiner

UNITED STATES PATENTS

| 3,036,925 | 5/1962 | Heuer | 106—59 |
|---|---|---|---|
| 3,141,785 | 7/1964 | Davies | 106—59 |

FOREIGN PATENTS

| 532,807 | 11/1956 | Canada. |
|---|---|---|
| 604,461 | 8/1960 | Canada. |

TOBIAS E. LEVOW, *Primary Examiner.*

J. E. POER, *Assistant Examiner.*